United States Patent Office 3,704,172
Patented Nov. 28, 1972

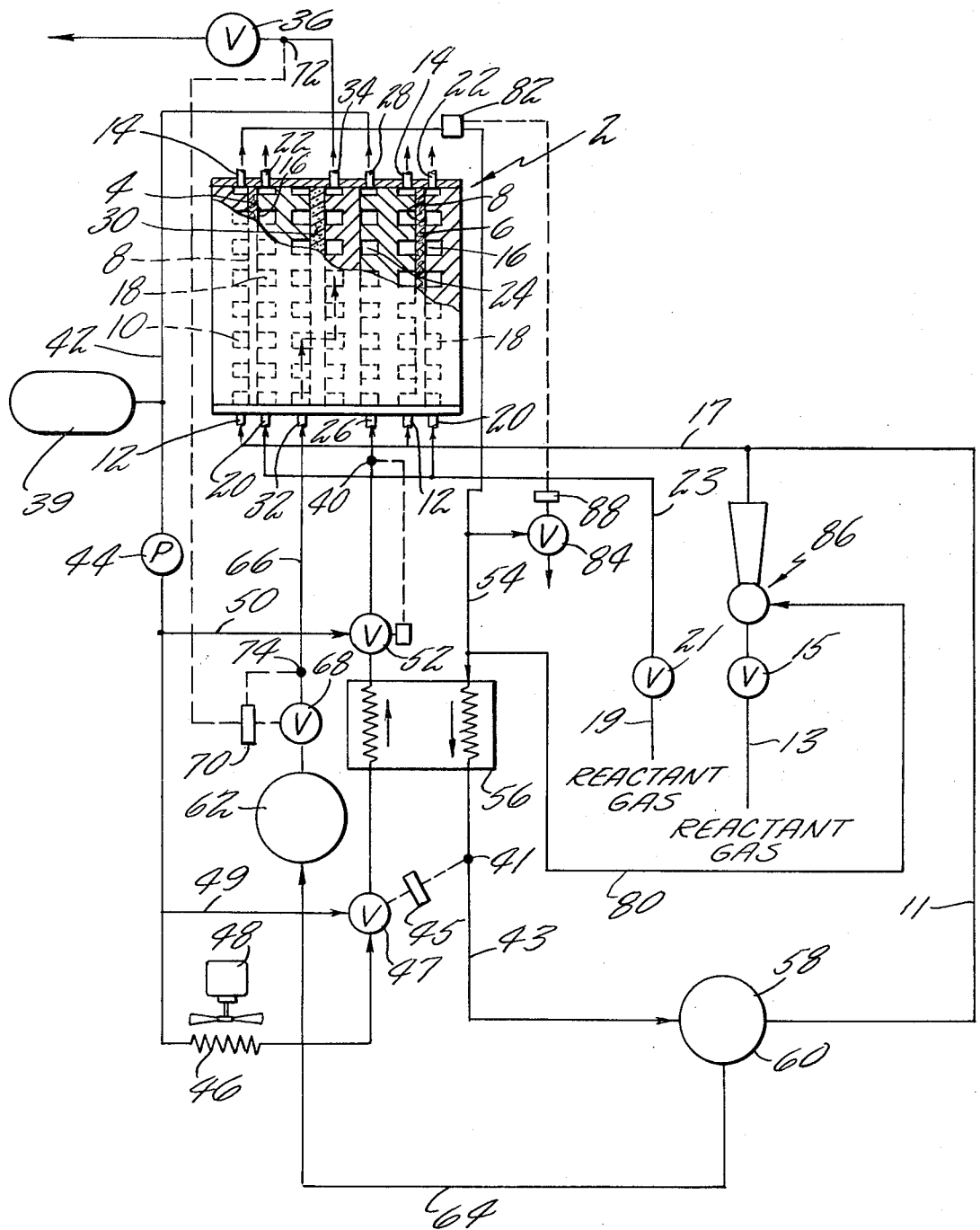

3,704,172
DUAL MODE FUEL CELL SYSTEM
James K. Stedman, Glastonbury, and Ronald Cohen, Newington, Conn., assignors to United Aircraft Corporation, East Hartford, Conn.
Filed Mar. 29, 1971, Ser. No. 128,774
Int. Cl. H01m 27/12
U.S. Cl. 136—86 C                     6 Claims

ABSTRACT OF THE DISCLOSURE

A dual mode fuel cell system is provided by the combination of a fuel cell power section with separate waste heat and electrolyte diluent removal subsystems for open cycle operation and for closed cycle operation.

---

The invention herein described was made in the course of or under a contract or subcontract thereunder, with the Department of the Air Force.

BACKGROUND OF THE INVENTION

Field of the invention

This invention relates to fuel cell systems and particularly to a dual mode power system in which open-cycle operation is employed for short duration peak power periods and a closed cycle mode is employed during long duration base power periods.

SUMMARY OF THE INVENTION

One object of the present invention is to provide a single reusable fuel cell system which provides the energy for both long duration base power loads and for short duration peak power loads. Start up of a separate peak power device or a base power system is not required, and there are no start-stop cycle delays or complex switching controls.

In accordance with the present invention a dual mode fuel cell system which attains the above-mentioned and other objects is provided by the combination of a fuel cell stack with separate heat and electrolyte diluent (such as product water) removal subsystems for open cycle operation and for closed cycle operation.

The function of the heat and electrolyte diluent removal subsystems is to maintain the correct fuel cell stack operating temperature and electrolyte concentration for optimum cell performance at all required loads and heat sink temperatures. The dual mode fuel cell system operates normally in the open cycle mode at high power levels, and in the closed cycle mode at low or base power levels. In the event of a mode malfunction power generation may be continued in the alternate mode. The full power range is available for a reduced operating time in the event of closed cycle component malfunction. The full operating time at reduced power levels is available in the case of open cycle component malfunction.

In the closed cycle mode electrolyte dilent may be removed from the fuel cell stack and stored for later use as coolant liquid for use during the open cycle mode. Waste heat is removed from the cell stack with a circulating coolant and rejected to the atmosphere with heat exchange means, such as a radiator. In the open cycle mode electrolyte diluent, carried by a stream of recirculating reactant gas in which the electrolyte diluent is formed, is vented overboard. Venting is automatic and starts whenever diluent must be removed at a rate higher than the rate the closed cycle electrolyte diluent removal subsystem can handle. Heat is removed by the evaporation and venting of stored liquid electrolyte diluent. Open cycle heat removal also commences automatically whenever it is required in order to maintain the fuel cell stack at the design temperature.

Our dual mode fuel cell system offers flexibility, simplicity and low weight. Operational flexibility comes from the capability of the system to reject waste heat either by vapor venting or by radiator means. This is particularly advantageous for space shuttle vehicles, where heat rejection by a radiator is impossible during reentry, or for satellites which require periodic high power but are limited in their allowable radiator areas. Heat and electrolyte diluent removal systems, component size and weight are minimized by the open cycle mode of operation which eliminates the need to size the closed cycle components for peak power operation. The weight of consumables is kept low because most of the energy is supplied during the efficient closed cycle mode. During base power operation, no reactants are vented for control purposes; hence the fuel cell stack operates efficiently at a low current density.

The foregoing and other objects, features and advantages of the present invention will become more apparent in the light of the following detailed description of a preferred embodiment thereof, as illustrated in the accompanying drawing.

BRIEF DESCRIPTION OF THE DRAWING

The sole figure is a schematic view of a dual mode fuel cell system in accordance with the present invention.

DESCRIPTION OF THE PREFERRED EMBODIMENT

Referring to the figure, there is shown a fuel cell power section shown generally by the numeral 2, having fuel cells 4 and 6. Each fuel cell has an anode 8, a first reactant gas chamber 10 adjacent thereto having an inlet 12 and an outlet 14. Each cell also has a cathode 16 and a second reactant gas chamber 18 adjacent thereto having an inlet 20 and an outlet 22. Electrolyte is disposed between the anode 8 and the cathode 16. A source of a first reactant gas, which may be a fuel gas such as hydrogen, is provided and is in fluid connection with the inlet 12 via conduit 13, pressure regulating valve 15 and conduit 17. A source of a second reactant gas, which may be an oxidant gas such as oxygen, is provided and is in fluid connection with the inlet 20 via a conduit 19, a pressure regulating valve 21 and a conduit 23.

During the operation of the fuel cells, an electrolyte diluent will be produced inherently in either the reactant gas chamber 10 or the reactant gas chamber 18 by the energy conversion process of said fuel cells depending on the type of electrolyte used. For example, if a base electrolyte, such as potassium hydroxide is utilized, the electrolyte diluent will be produced in the reactant gas chamber 10 adjacent the anode 8. If the fuel gas is hydrogen and the oxidant gas is oxygen, the electrolyte diluent will be water. If, however, the electrolyte s an acid, such as phosphoric or sulphuric acid, the electrolyte diluent, which may be water, will be produced in the reactant gas chamber 18 adjacent the cathode.

Since hydrogen and oxygen are common fuel and oxidant gases utilized in fuel cells, and potassium hydroxide is a widely known electrolyte, the preferred embodiment will be described as if these materials were utilized in operation of our fuel cell system. The electrolyte diluent in that case would be water, and it would be produced in the chamber 10. However, it will readily be understood by those skilled in the art that other fuel gases, oxidant gases and electrolytes known in the art can also be utilized in our fuel cell system, which will still provide the advantages and features enumerated herein. The fuel cell power section 2 also includes a coolant liquid passage 24 having an inlet 26 and an outlet 28 for closed cycle mode operation cooling of the fuel cell power section, and evaporative cooling means 30 having a liquid inlet 32 and a vapor outlet 34 for open cycle mode operation cooling.

Pressure relief means 36 which may be a pressure relief valve, is disposed in the vapor outlet 34.

Closed cycle operation cooling is provided by means in fluid connection with the liquid coolant passage 24 which include a liquid coolant and means for controlling the amount of cooling provided by the coolant to the fuel cells to maintain the cells at within a predetermined temperature range. The closed cycle operation cooling means may take the form of fuel cell temperature sensing means 40, a conduit loop 42 in fluid connection with the inlet 26 and the outlet 28 of the liquid coolant passage 24, pump means 44, heat exchange means 46 for cooling the coolant, which may be, for example, a radiator having a fan and motor assembly 48, a bypass conduit 50 around the heat exchange means 46, and valve means 52 operatively connected to the temperature sensing means 40 for regulating the flow of coolant through the bypass as a function of the cell temperature. The conduit loop 42 may also include an accumulator 39.

Close cycle electrolyte diluent removal is provided by means in fluid connection with the reactant gas chamber 10 in which the electrolyte diluent (which may be water) is produced. The closed cycle electrolyte diluent removal means may take the form of a conduit loop 54, a condenser 56 in which a portion of the diluent is condensed, pump means 58 and a gas/liquid separator 60. The pump means 58 and the separator 60 can be combined as a gas/liquid pump separator, as is known in the art. The diluent, which is condensed and separated, may be fed to liquid storage means 62 via conduit 64 and stored for use as a coolant during open cycle operation cooling. The gas may be fed to the cell inlets 12 via conduit 11 and conduit 17. Cooling for the condenser 56 may be conveniently provided by the closed cycle operation coolant loop 42. A temperature sensor 41 is disposed downstream of the condenser in conduit 43 and operatively connected to control means 45 of valve means 47. Valve means 47 controls the flow through a bypass 49 around heat exchanger means 46, and thereby controls the temperature of the coolant passing through the condenser 56, thus regulating the amount of diluent condensed therein.

Open cycle operation cooling is provided by means in fluid connection with said liquid inlet 32 of said evaporative cooling means 30, including a liquid coolant and means for controlling the amount of coolant fed to the inlet 32 as a function of the vapor pressure in the outlet 34 of the evaporative cooling means 30 since the vapor pressure is a function of cell temperature. The open cycle operation cooling means may take the form of a source of liquid coolant, which may be the liquid storage means 62. Of course, as will be obvious to those skilled in the art, the source of coolant need not be the liquid storage means 62, but conveniently in our system, it is. A conduit 66 connects the source of coolant to the liquid inlet 32 of the evaporative cooling means 30 and has valve means 68 disposed therein. Control means 70 are provided, operatively connected to first pressure sensing means 72 in the vapor outlet 34 of said evaporative cooling means 30, operatively connected to second pressure sensing means 74 in the conduit 66 and operatively connected to valve means 68 for regulating the valve means to maintain a predetermined pressure differential between the vapor outlet 34 and the coolant liquid in the conduit 66.

Open cycle operation electrolyte diluent removal is provided by means in fluid connection with the reactant gas chamber in which the diluent is produced, including means for sensing the humidity at the outlet of that reactant gas chamber, and control means for regulating the removal means as a function of the sensed humidity. The open cycle operation electrolyte diluent removal means may take the form of a conduit loop, including conduit 54, conduit 80 and conduit 17, with the loop containing humidity sensing means 82 disposed in the conduit 54 downstream of the reactant gas chamber in which the diluent is produced. The loop also includes valve means 84 connecting the loop with ambient, pump means 86, and control means 88 operatively connected to humidity sensing means 82 and to valve means 84 for venting a portion of the flow as a function of the humidity sensed. The pump means 86 is shown as an ejector in which the power for providing flow in the open cycle diluent removal loop is provided by the incoming reactant gas. However, as will be understood by those skilled in the art, this is merely a convenient means for doing so, and any pump means known in the art, such as a fan, for example, would be satisfactory.

There has thus been described a preferred embodiment of a fuel cell system in accordance with the present invention. It will be understood by those skilled in the art that various changes and omissions in the form and detail thereof may be made therein without departing from the spirit and scope of the invention.

What we claim as novel and desire to secure by Letters Patent of the United States is:

1. A fuel cell system having at least one fuel cell capable of closed cycle operation and open cycle operation comprising:

a fuel cell having an anode, a cathode, electrolyte disposed therebetween, a first reactant gas chamber disposed adjacent the anode, said first chamber having an inlet and an outlet, a second reactant gas chamber disposed adjacent the cathode, said second chamber having an inlet and an outlet, one of said reactant gas chambers having electrolyte diluent produced therein by the energy conversion process of said fuel cell, a liquid coolant passage in said fuel cell for closed cycle operation cooling, said coolant passage having an inlet and an outlet, and evaporative cooling means for open cycle operation cooling in said fuel cell, said evaporative cooling means having a liquid inlet and a vapor outlet, and pressure relief means in said vapor outlet;

a source of a first reactant gas in fluid connection with said inlet of said first reactant gas chamber;

a source of a second reactant gas in fluid connection with said inlet of said second reactant gas chamber;

closed cycle operation cooling means in fluid connection with said liquid coolant passage, said cooling means including a liquid coolant and means for controlling the amount of cooling provided by the liquid coolant to said fuel cell to maintain said fuel cell at a predetermined temperature;

closed cycle operation electrolyte diluent removal means in fluid connection with said reactant gas chamber in which the electrolyte diluent is produced, said removal means including condensing means for condensing a portion of the diluent as a function of the condenser exit temperature;

open cycle operation cooling means in fluid connection with said liquid inlet of said evaporative cooling means, said cooling means including a liquid coolant and means for controlling the amount of liquid coolant fed to said inlet as a function of the vapor pressure in said vapor outlet of said evaporative cooling means; and open cycle operation electrolyte diluent removal means in fluid connection with said reactant gas chamber in which the electrolyte diluent is produced, said removal means including means for sensing the humidity of the reactant gas leaving said reactant gas chamber in which the electrolyte diluent is produced, and including control means for regulating said diluent removal means as a function of the humidity sensed.

2. A fuel cell system as defined in claim 1, wherein said closed cycle operation cooling means comprises fuel cell temperature sensing means, a conduit loop in fluid connection with said inlet and said outlet of said liquid coolant passage, said conduit loop including pump means, heat exchange means for cooling said liquid coolant, a bypass conduit around said heat exchange means and valve means for regulating the flow through said bypass conduit as a function of the fuel cell temperature.

3. A fuel cell system as defined in claim 1, wherein said closed cycle electrolyte diluent removal means comprises:

a conduit loop in fluid connection with said inlet and said outlet of said reactant gas chamber in which the electrolyte diluent is produced, said conduit loop including said condensing means pump and a gas/liquid separator disposed downstream of said condensing means.

4. A fuel cell system as defined in claim 3, further comprising:

liquid storage means;
first conduit means connecting said liquid storage means with said gas/liquid separator;
second conduit means connecting said liquid storage means with said liquid inlet of said evaporative cooling means;
valve means disposed in said second conduit means;
first pressure sensing means for sensing the pressure in said vapor outlet of said evaporative cooling means;
second pressure sensing means for sensing the liquid pressure in said second conduit means; and
control means operatively connected to said valve means and to said first and second pressure sensing means for regulating said valve means to maintain a predetermined differential pressure between said vapor outlet pressure and said liquid pressure in said second conduit means.

5. A fuel cell system as defined in claim 1, wherein said open cycle operation electrolyte diluent removal means comprises:

a conduit loop in fluid connection with said inlet and said outlet of said reactant gas chamber in which the electrolyte diluent is produced, said conduit loop including said humidity sensing means, valve means connecting said conduit loop with ambient, pump means, and control means operatively connected to said humidity sensing means and to said valve means for venting a portion of the flow as a function of the humidity sensed.

6. A fuel cell system as defined in claim 1, wherein said open cycle operation cooling means comprises:

a source of coolant liquid;
conduit means connecting said source of coolant liquid with said liquid inlet of said evaporative cooling means;
valve means disposed in said conduit means;
first pressure sensing means for sensing the pressure in said vapor outlet of said evaporative cooling means;
second pressure sensing means for sensing the liquid pressure in said conduit means; and
control means operatively connected to said valve means and to said first and second pressure sensing means for regulating said valve means to maintain a predetermined pressure differential between said vapor outlet and said liquid pressure in said conduit means.

References Cited

UNITED STATES PATENTS

| | | | |
|---|---|---|---|
| 3,172,784 | 3/1965 | Blackmer | 136—86 E |
| 3,370,984 | 2/1968 | Platner | 136—86 R |
| 3,507,702 | 4/1970 | Sanderson | 136—86 C |

ALLEN B. CURTIS, Primary Examiner